March 10, 1942. W. SIDNEY 2,276,106
WELDING CATHODE SLEEVE
Filed June 27, 1940
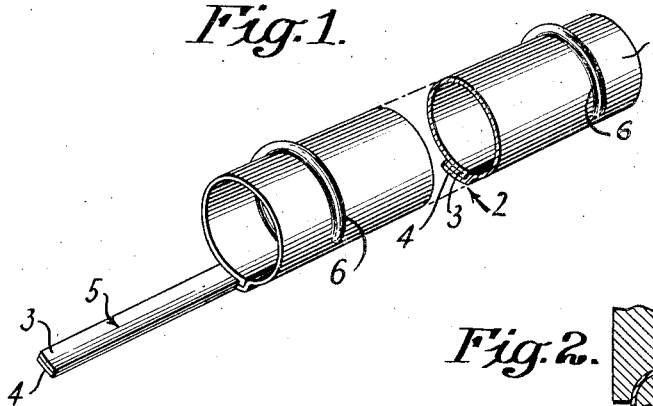
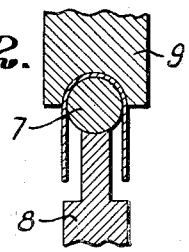
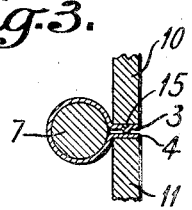 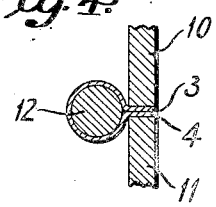
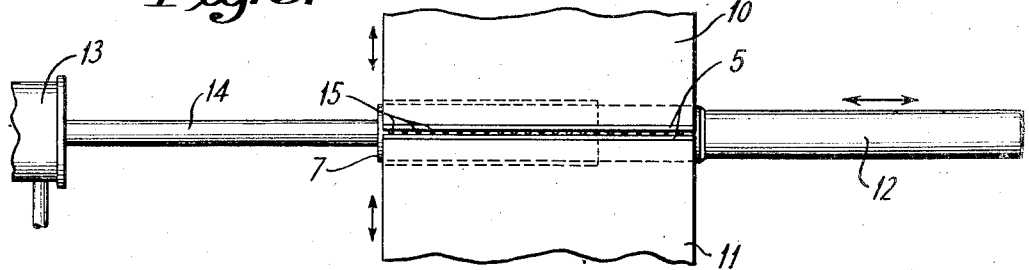
Inventor
Watson Sidney,
By Charles McClair
Attorney Patented Mar. 10, 1942

2,276,106

UNITED STATES PATENT OFFICE 2,276,106

WELDING CATHODE SLEEVES

Watson Sidney, Summit, N. J., assignor to Radio Corporation of America, a corporation of Delaware Application June 27, 1940, Serial No. 342,621

8 Claims. (Cl. 219—10)

My invention relates to a method of and machine for making indirectly heated cathode sleeves.

Cathode sleeves have been proposed made from flat sheet metal stock wrapped around a mandrel with the longitudinal edged portions of the sheet welded together. Uniform seams and smooth well-shaped sleeves are difficult by this method. The low electrical resistance between the tightly wrapped metal sheet and its mandrel shunts most of the welding current from the interface of the seam, and the tightly drawn sheet, when heated by the welding current, pulls into the irregularities of the mandrel and prevents withdrawal of the mandrel from the closed cylinder. Further, as the welding electrodes must move forward while the sheet metal is molten to permit "hot push up" of the welding interfaces, the sheet tautened on the surface of the mandrel prevents the necessary movement of the metal. If the metal sheet is loosely wrapped on the mandrel to permit hot push up and allow easy removal of the sleeve from the mandrel, the sleeve cannot be accurately sized and shaped.

An object of my invention is an improved method of making a cathode sleeve with a longitudinal welded seam along one side of the sleeve, which is easy to remove from its mandrel and which does not require excessive welding current.

Another object of my invention is an improved method of making welded seam cathode sleeves which are easy and inexpensive to make and which are accurately sized and shaped in manufacture.

Still another object of my invention is a machine for making a seamed cathode that is uniformly and securely welded along the seam and which is formed with an accurate and predetermined cross sectional configuration.

The characteristic features of my invention are defined in the appended claims, and one embodiment is described in the following specification and shown in the accompanying drawing in which Figure 1 is a perspective view of a cathode sleeve made according to my invention, Figures 2, 3 and 4 show in section, respectively, three principal steps in the manufacture of a cathode sleeve according to my invention, and Figure 5 is a side view of the mandrel and welding electrodes shown in section in Figures 3 and 4.

The cathode sleeve shown in Figure 1 and made according to my invention comprises a single piece of sheet metal rolled into a round cylinder 1 and closed by a seam 2 extending longitudinally along one side of the sleeve. The edge portions or flanges 3 and 4 of the sheet metal are formed outwardly in a conventional stand-up seam, are welded together and are then laid over against the side of the cylinder. The two layers of the flanges may be extended beyond the end of the cylinder to form a two layer integral tab 5 as shown. Embossings 6, for mica stops, may, if desired, be pressed in the sheet metal before it is rolled into the cylinder.

As shown in Figure 2 the blank is first laid over forming mandrel 7, supported upon plunger 8, and folded by a swage 9. Plunger 8 is then withdrawn while dies 10 and 11 enter from each side of the plunger to wrap the blank around the mandrel and to force the two edge portions of the blank together, as shown in Figure 3. Welding dies or electrodes 10 and 11 are preferably electrically insulated in the machine so that welding current may be passed through the contacting surfaces of the flanges 3 and 4, sufficient pressure being applied to the electrodes to force the metal of the flanges together as the metal softens and welds. It has been found by experience that if the sheet is wrapped tightly around the mandrel 7, as shown in Figure 3, before welding commences that imperfect welds are produced, apparently because the tight fitting sheet on the mandrel does not permit free forward movement of the welding electrodes or "hot push up."

I propose according to my invention to replace the forming mandrel 7 with a second or welding mandrel 12 having smaller circumferential dimensions than the forming mandrel so that the diameter of the cylinder may be reduced without binding and permit free hot push up of the welding electrodes. Figure 5 shows one conventional mechanism for practicing my improved method of making welded seam cathodes. Forming mandrel 7 is shown end-to-end with welding mandrel 12, the two being reciprocable through the cylinder by any convenient driving means. Hydraulic actuating means 13 with a piston rod 14 may, for example, be connected directly to the end of mandrel 7 for withdrawing mandrel 7 after the cylinder has been formed and to bring welding mandrel 12 into the cylinder and before the welding operation is started. Reciprocation of the mandrels may of course be synchronized with the driving mechanism for the welding electrodes 10 and 11 for automatic operation. The difference in the sizes of the two mandrels 7 and 12 will, of course, depend upon the thickness of the stock to be welded, and the desired distance of travel of the flanges during welding. The travel distance of the flanges may, in turn, depend upon the height of embossed beads 15 on the faces of the flanges, the beads having been found desirable to weld low resistance material, such as nickel.

The forming mandrel is preferably made of some hard wear resisting material such as steel to withstand the abrasions of the forming tools 8, 9, 10 and 11, while the mandrel 12 is preferably made of a high electrical resistant material such as oxidized iron or ceramic.

The diameter of the welding mandrel 12 is so chosen that as the welding electrodes arrive at the end of their travel during welding, the walls of the sleeve are drawn into snug but no binding engagement with the sides of the mandrel and are hence accurately sized and shaped so that distortions placed in the walls because of the high temperature welding will not distort the sleeve.

Alternatively, the forming mandrel 7 may be made collapsible, as shown in Figure 6, to the diameter of the welding mandrel 12.

My improved method of making a cathode sleeve with a longitudinally welded seam along one side of the sleeve accurately sizes and shapes the sleeve, is easy and inexpensive to practice and provides a uniform and firmly welded seam along the side of the sleeve.

I claim:

1. The method of making a seamed sheet metal cylinder comprising the steps of wrapping a rectangular piece of sheet metal around a mandrel and forming outwardly the two longitudinal edge portions of the sheet, drawing the sheet metal cylinder into snug contact with the side of the mandrel to form the cylinder to the mandrel while pressing the two registering side faces of the outwardly extending edge portions into contact, then supporting the formed cylinder on a mandrel smaller in circumference than the first-mentioned mandrel, and, while pressing together said edge portions, passing welding current through said portions to heat said edge portions to welding temperature and to shrink said cylinder onto said smaller mandrel.

2. The method of making a cathode sleeve formed from a strip of sheet metal with the longitudinal edged portions of the strip welded together, comprising wrapping a piece of said sheet metal around a first mandrel, forming of said edge portions side-by-side upstanding flanges, holding said flanges together while removing said first mandrel from the formed cylinder and inserting a second mandrel of slightly smaller circumferential dimensions than the first mentioned mandrel, and heating said flanges to melting temperature and pressing the flanges together while at said temperature.

3. A machine for making welded seam metal sleeves comprising a forming mandrel, means for wrapping a sheet metal blank around said forming mandrel and for forming upstanding flanges along the edges of the sheet parallel to the axis of the mandrel, a second mandrel of smaller circumferential size than said forming mandrel, reciprocatable welding electrodes on opposite sides of said flanges for pressing together and holding said flanges, means to replace the first-mentioned mandrel in the sleeve with the second-mentioned mandrel while the sleeve is so held by its flanges, means for passing welding current between the electrodes through said flanges to weld together said flanges while the blank is supported on the second-mentioned mandrel.

4. A machine for making a cathode sleeve with a welded seam comprising a forming mandrel of wear resistant material, a welding mandrel of electrical resistant material joined end-to-end with the first mentioned mandrel, and means for reciprocating said mandrels.

5. A machine for making a cathode sleeve formed from a strip of sheet metal, the longitudinal edge portions of the strip being welded together, comprising a forming mandrel of wear-resistant material about which the sheet metal is wrapped, means for forming said sheet metal snugly around said forming mandrel and for forming of said edge portions side-by-side upstanding flanges, and welding electrodes for pressing together said flanges and holding the wrapped sheet metal sleeve, a second mandrel and means for replacing the first-mentioned mandrel with said second mandrel while the flanges and sleeve are held by the electrodes, and means for passing welding current between the electrodes through the flanges while the flanges are pressed together, the circumferential size of the second mandrel being smaller than the inside size of the finished sleeve.

6. A machine for making a tubular electrode, comprising a forming mandrel about which said electrode may be wrapped, two aligned welding electrodes with extended welding surfaces parallel to the side of the forming mandrel, said electrodes being reciprocatable on a line normal to a plane through the axis of the mandrel, a welding mandrel slightly smaller in circumferential dimension than the first-mentioned mandrel and joined end-to-end with said first-mentioned mandrel, and means for reciprocating said mandrels and said electrodes in synchronism.

7. The method of making a cathode sleeve from a strip of sheet metal comprising snugly wrapping the sheet around a mandrel, forming upstanding side-by-side flanges along the longitudinal edges of the sheet, pressing said flanges together to hold said flanges and the formed sleeve while replacing the first-mentioned mandrel with a second mandrel of slightly smaller diameter than said formed sleeve, and then, while the flanges are pressed together, passing welding current through the flanges.

8. The method of making a cylinder from a strip of sheet metal with edge portions of the strip longitudinally of the cylinder welded together, comprising wrapping a piece of sheet metal around a mandrel and forming said sheet to the contour of the surface of said mandrel, and forming the edge portions of the sheet into side-by-side upstanding flanges longitudinally of the mandrel, the flanges being in contact while the cylinder and mandrel are in contact, then relieving the pressure between the cylinder and mandrel, and then passing welding current transversely through the contacting flanges while the flanges are pressed together.

WATSON SIDNEY.